(12) United States Patent
Kumar

(10) Patent No.: US 12,452,548 B2
(45) Date of Patent: Oct. 21, 2025

(54) MANAGEMENT OF VIDEO DATA PROCESSING USING MULTIPLE VIDEO PROCESSING COMPUTERS

(71) Applicant: DRAGONFRUIT AI, INC., Menlo Park, CA (US)

(72) Inventor: Amit Kumar, Menlo Park, CA (US)

(73) Assignee: DRAGONFRUIT AI, INC., Menlo Park, CA (US)

(*) Notice: Subject to any disclaimer, the term of this patent is extended or adjusted under 35 U.S.C. 154(b) by 0 days.

(21) Appl. No.: 18/061,317

(22) Filed: Dec. 2, 2022

(65) Prior Publication Data
US 2024/0187742 A1 Jun. 6, 2024

(51) Int. Cl.
*H04N 23/80* (2023.01)
*G06V 10/94* (2022.01)
*G06V 20/40* (2022.01)

(52) U.S. Cl.
CPC ............ *H04N 23/80* (2023.01); *G06V 10/95* (2022.01); *G06V 20/41* (2022.01)

(58) Field of Classification Search
CPC ........ H04N 23/80; G06V 10/95; G06V 20/41; G06V 10/955; G06V 20/52
See application file for complete search history.

(56) References Cited

U.S. PATENT DOCUMENTS

| | | | |
|---|---|---|---|
| 7,583,658 B1* | 9/2009 | Wang | G10L 19/22 370/352 |
| 9,407,944 B1* | 8/2016 | Galdy | H04N 21/2402 |
| 2014/0258446 A1* | 9/2014 | Bursell | G06F 9/45558 709/217 |
| 2015/0143363 A1* | 5/2015 | Gombert | G06F 9/5083 718/1 |
| 2017/0185450 A1* | 6/2017 | Le Bars | G06F 9/5077 |
| 2017/0214927 A1* | 7/2017 | Zenoni | H04N 19/42 |
| 2022/0156114 A1* | 5/2022 | Nagpal | G06F 11/3409 |

OTHER PUBLICATIONS

Z. Kapach et al., "Cloud Resource Optimization for Processing Multiple Streams of Visual Data," in IEEE MultiMedia, vol. 26, No. 3, pp. 31-41, Jul. 1-Sep. 2019, doi: 10.1109/MMUL.2018.2890255. (Year: 2019).*

* cited by examiner

*Primary Examiner* — Timothy J Henn

(57) ABSTRACT

Systems, methods, and software to manage the distribution of video data for processing across multiple computers. In at least one implementation, a management service obtains resource usage associated with video processing computers, wherein each of the video processing computers manages video processing of video data associated with one or more cameras. The management service further identifies trends based on the resource usage and, for at least a first video processing computer, generates a processing schedule for first video processing computer to distribute the video processing to one or more other video processing computers. The management service also configures the first video processing computer with the video processing schedule.

20 Claims, 5 Drawing Sheets

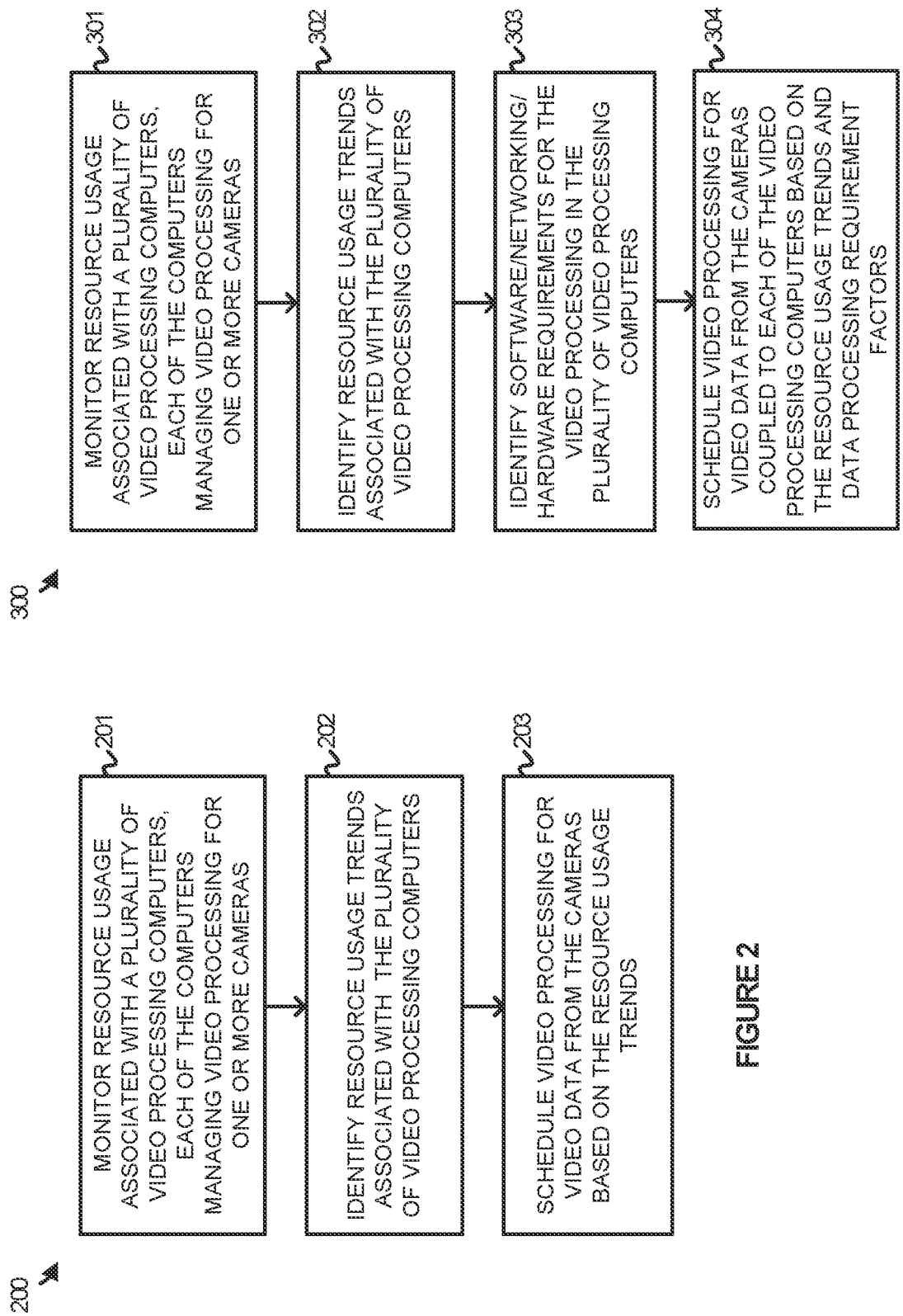

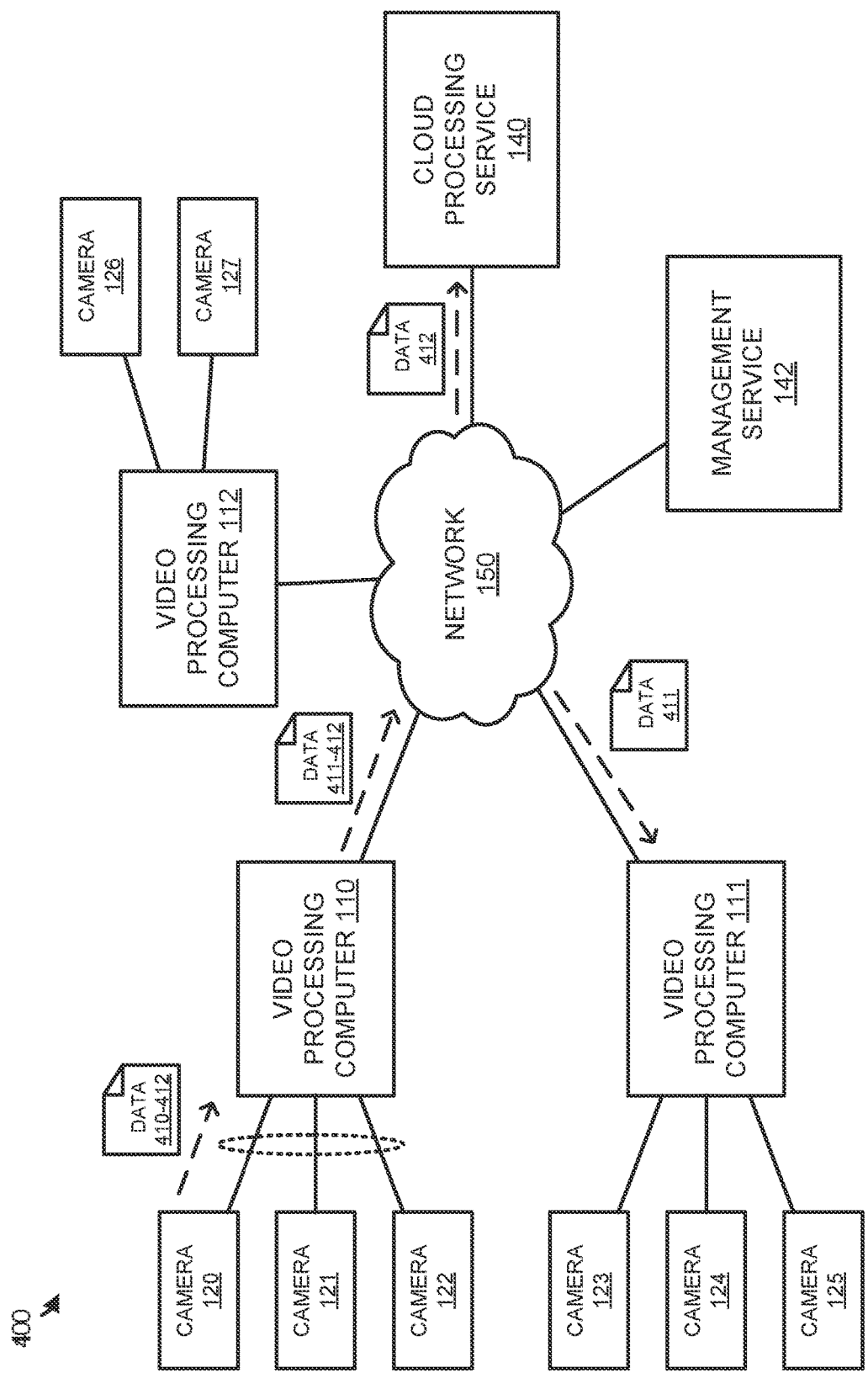

MANAGEMENT OF VIDEO DATA PROCESSING USING MULTIPLE VIDEO PROCESSING COMPUTERS

BACKGROUND

Video data generated from cameras can provide insight about a variety of different environments, including businesses, residences, nature, or some other environment. As the information is obtained, often a user must view the video data to identify objects or information of interest in the different frames. The observations are used to identify objects of interest, such as people, vehicles, and the like, identify the movement of objects within the frame of the video, or provide some other observation.

In current systems, computers can automate at least a portion of the observations described above with greater efficiency and, in some examples, accuracy. A computing system can be configured to identify specific objects, track specific objects, identify movement, or provide some other operation in association with video data from one or more cameras. However, as a system becomes more complex with a greater number of operations and a greater number of camera feeds to apply the operations, resource availability can be a bottleneck in an environment. This can delay or stop operations on the video data when the available computing resources are limited locally or can force an organization to deploy the operations in a cloud service, which can increase cost and network overhead in communicating with the cloud service.

OVERVIEW

Provided herein are systems, methods, and software to manage the distribution and processing of video data in a computing environment. In one implementation, a method includes monitoring resource usage associated with video processing computers during a first period, wherein each video processing computer of the video processing computers manages video processing of video data associated with one or more cameras. The method further includes identifying resource usage trends associated with each of the plurality of video processing computers. The method also provides, for a first video processing computer of the video processing computers, generating a video processing schedule for a second period for the video data from the one or more cameras managed by the first video processing computer based on the resource usage trends, wherein the video processing schedule assigns the video processing to two or more video processing computers of the video processing computers, and configuring the first video processing computer with the video processing schedule.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates an operation of scheduling video processing across computers according to an implementation.

FIG. 3 illustrates an operation of scheduling video processing across computers according to an implementation.

FIG. 4 illustrates an operational scenario of distributing video data in a computing environment for processing according to an implementation.

DETAILED DESCRIPTION

Figure 1:
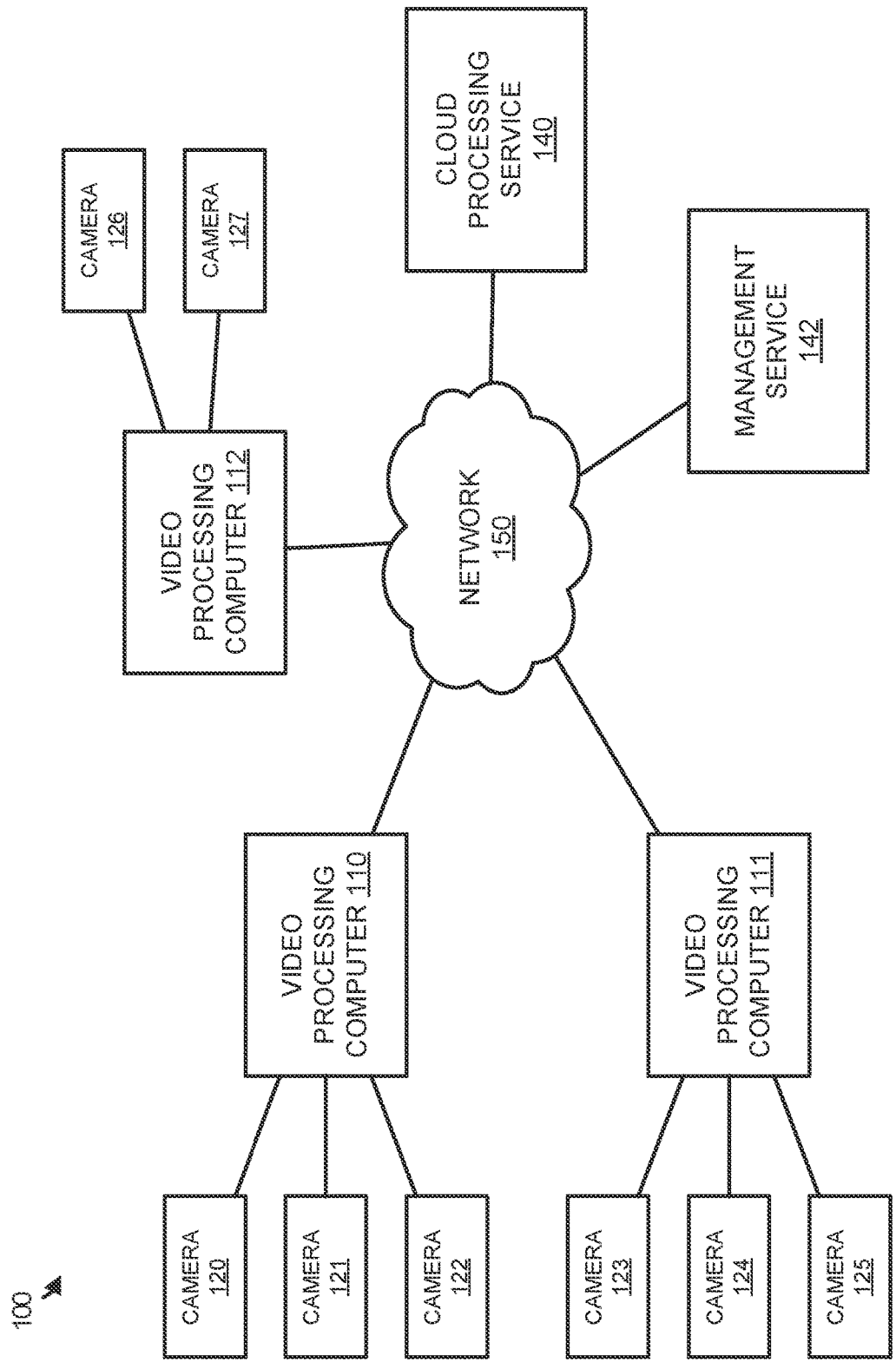
FIG. 1 illustrates a computing environment to manage video processing across multiple computers according to an implementation.

FIG. 1 illustrates a computing environment 100 to manage video processing across multiple computers according to an implementation. Computing environment 100 includes video processing computers 110-112, cameras 120-127, cloud processing service 140, management service 142, and network 150. Video processing computers 110-112 can comprise desktop computers, laptop computers, servers, or some other computers. Video processing computers 110-112 can represent a computer on a local network, wherein cameras are managed by the corresponding video processing computer. Cloud processing service 140 and management service 142 can each comprise one or more computing devices distributed across one or more data centers.

In computing environment 100, video processing computers 110-112 each manage the video processing associated with corresponding cameras of cameras 120-127. As an example, video processing computer 110 can execute at a business where cameras 120-122 provide security in association with the businesses. Each video processing computer 110-112 can manage different operations in association with the video data including compression of the video data, identification of objects within the video data, monitoring movement of objects in the video data, or providing some other operation in association with the video data. The different operations can be specified by an administrator associated with each of the video processing computers. For example, a first operation at a first video processing computer can be used to identify first objects of interest in the video data, while a second operation at a second video processing computer can identify second objects of interest. Other video processing computers can be directed to identify the movement of objects, compress, or delete video data without movement within the video data, flag content for further analysis, or provide some other operation in association with the video data from cameras 120-127.

In addition to video processing computers 110-112, management service 142 is provided that can distribute the video processing between the different video processing computers 110-112. This can permit a video processing computer to offload some of the processing operations to one or more other computer in computing environment 100. In at least one example, management service 142 can monitor the resource usage at each of the video processing computers, wherein the resource usage can include processor resource usage as a function of time, memory resource usage as a function of time, or some other resource usage at a video processing computer. In some examples, the resource usage can be linked to a particular operation, such that management service 12 can identify resource usage in associated with each individual operation.

As the resource usage is monitored in association with video processing computers, management service 142 identifies trends associated the resource load at each of the video processing computers 110-112. The trends can identify processor resource usage as a function of time, memory resource usage as a function of time, or some other trend that predicts the resource usage in association with video processing computers 110-112. After identifying the trends, management service 142 can, for a first video processing computer (e.g., video processing computer 110) in computing environment 100, generate a video processing schedule for the video data from cameras 120-122 based on the trends. The schedule can permit the video processing operations to be distributed to any number of the video processing computers of video processing computers 111-112. For example, if video processing computer 112 were identified to have a decreased resource load, at least a portion of the operations from video processing computer 110 can be offloaded to video processing computer 112. Advantageously, while bottlenecks could occur at video processing computer 110, at least a portion of the video processing operations can be offloaded to other video processing computers to process the required video data more efficiently. Further, if video processing computer 110 were offloading additional processing resources to cloud processing service 140, scheduling processing at other video processing computers 111-112 can potentially save cost in association with using a cloud service provider. Further examples, of scheduling the resources associated with video processing computers 110-112 are described below with respect to FIGS. 2 and 3.

FIG. 2 illustrates an operation 200 of scheduling video processing across computers according to an implementation. The steps of operation 200 are referenced parenthetically in the paragraphs that follow with reference to systems and elements of computing environment 100 of FIG. 1. Operation 200 is provided by management service 142 and, while management service 142 is depicted separate from video processing computers 110-112, management service 142 can be implemented wholly or partially on one or more of video processing computers 110-112.

For operation 200, management service 142 monitors (201) resource usage associated with a plurality of video processing computers, wherein each of the video processing computers manage video processing associated with one or more cameras. The resource usage can comprise processor resource usage, memory resource usage, and the like. In some examples, the resource usage can be linked to individual video processing operations, wherein the video processing operations can be for local cameras (e.g., cameras 120-122 in the example of video processing computer 110) or can be for remote cameras (e.g., cameras 123-127 in the example of processing computer 110). Local cameras can be on the same local network as the corresponding video processing computer, while remote cameras are located on another local network accessible via the internet or some other network.

As the resource usage information is monitored, operation 200 further identifies (202) resource usage trends associated with each of the plurality of video processing computers. The trends can predict the processing resource usage, memory resource usage, or some other resource usage in association with the video processing computers. Additionally, the trends can identify predictions for the individual video processing operations for video processing computers 110-112. As an example, a process required for cameras 120-122 can require a first resources during a first period, while a second process for cameras 126-127 can require a different set of resources.

After the trends or the predictions associated with the resource usage at video processing computers 110-112, operation 200 further schedules (203) video processing for the video data generated from the cameras managed by the video processing computers based on the trends. In at least one example, for a first video processing computer (e.g., video processing computer 110), management service 142 generates a video processing schedule for the video data from cameras 120-122 managed by video processing computer 110 based on the resource usage trends. The schedule can assign the video processing to two or more video processing computers in computing environment 100. For example, a first portion of the video processing can be performed by video processing computer 110, while a second portion of the video processing can be performed by video processing computer 111. The division of processing can include processing for different cameras, processing for different objects, processing for a first filter and processing for a second more refined filter, or some other division of processing. As an example, the video data from cameras 120-122 can be processed by video processing computer 110 to determine whether additional processing is required. When additional processing is required, relevant video data can be communicated via network 150 to video processing computer 111 for additional processing. Advantageously, in this example, only a portion of the video data is required to be communicated to video processing computer 111, limiting networking overhead associated with the distributive operations. Once the operations are performed, data can be returned to video processing computer 110, wherein the returned data will depend on the type of operation performed by video processing computer 111. For example, video processing computer 111 may provide an indication that an object of interest is identified in the video data and/or timestamps associated with the object of interest.

While demonstrated as scheduling the operations in association with video processing computer 110, similar operations are also performed in association with the other video processing computers. The scheduling is used to indicate the data processing that is performed for local cameras, the video processing that should be offloaded to other video processing computers, and the video processing that will be taken for other video processing computers.

FIG. 3 illustrates an operation 300 of scheduling video processing across computers according to an implementation. The steps of operation 300 are referenced parenthetically in the paragraphs that follow with reference to systems and elements of computing environment 100 of FIG. 1.

For operation 300, management service 142 monitors (301) resource usage associated with a plurality of video processing computers, wherein each of the video processing computers manage video processing associated with one or more cameras. The resource usage can comprise processor resource usage, memory resource usage, and the like. In some examples, the resource usage can be linked to individual video processing operations, wherein the video processing operations can be for local cameras (e.g., cameras 120-122 in the example of video processing computer 110) or can be for remote cameras (e.g., cameras 123-127 in the example of processing computer 110).

As the resource usage information is monitored, operation 200 further identifies (302) resource usage trends associated with each of the plurality of video processing computers. The trends can predict the processing resource usage, memory resource usage, or some other resource usage in association with the video processing computers. Additionally, the trends can identify predictions for the individual video processing operations for video processing computers 110-112. As an example, a process required for cameras 120-122 can require a first resources during a first period, while a second process for cameras 126-127 can require a different set of resources.

Here, in addition to identifying the trends associated with resource usage, operation 300 further identifies (303) software requirements, networking (latency, loss, and the like) requirements, or hardware requirements associated for the video processing in the plurality of video processing computers. The software requirements can include applications, services, and the like that can provide the video data processing for one or more applications. For example, cameras 120-122 can require a first video processing application, while cameras 126-127 can require a second application. Similarly, different video processing applications or services can require specific hardware, including processor types or processing cores capable of providing encoding or decoding, or some other operation. Management service 142 can identify any of the software requirements, hardware requirements, or networking requirements associated with a data processing operation for cameras 120-127 in computing environment 100. In at least one example, video data processing for at least one camera can indicate that the video data should not be communicated to another video processing computer for processing, limiting security risks associated with the communication of the video data. The hardware, software, and networking requirements associated with the video processing can be specified by an administrator associated with each video processing computer of video processing computers 110-112. Management service 142 can use this information to determine how to schedule the processing in computing environment 100.

In at least one implementation, an organization or set of users may dictate that data should only be shared between computers of the organization or set of users. As an example, video processing computers 110-111 can belong to the same organization, while video processing computer 112 belongs to a second organization. An administrator associated with video processing computer 110-111 can configure or indicate the approved video processing computers for the video data. The approved computers can use virtual private networking, encryption, and other security operations to provide security when communicating data between the different video processing computers. The exchanged data may comprise the video data itself (e.g., communicated form video processing computer 110 to video processing computer 111), may comprise the results of the video processing (e.g., identifying objects of interest, movement of the objects of interest, and the like), or some other information. For example, video processing computer 110 can communicate video data to video processing computer 111 to determine whether objects of interest (e.g., people) are in the video data. The results of the processing can then be provided back to video processing computer 110, wherein video processing computer can take an action based on the results. The action can include storing the data, generating a notification for a user of the video processing computer, or some other action based on the information.

Operation 300 further schedules (304) video processing for video data from cameras 120-127 coupled to each of the video processing computers based on the resource usage trends and data processing requirement factors. Each of the video processing computers can then be configured with the corresponding schedule. In at least one example, management service 142 may, for each video processing computer (e.g., video processing computer 110), determine whether resources available at video processing computer 110 can support the associated video processing load from cameras 120-122. If video processing computer 110 can support the processing of video data from cameras 120-122 during a first period, then the video processing can be scheduled at video processing computer 110. If the video processing computer 110 cannot support the processing of the video data from cameras 120-122, management service 142 can select at least one other video processing computer of video processing computers 111-112 to support the processing of the video data. The at least one other video processing computer can be selected when resources are available at the video processing computer to support the additional processing provided from video processing computer 110. Advantageously, management service 142 may prioritize maintaining the video processing at the local video processing computer and offload to other video processing computers as required to support the video processing operations for the local cameras. The one or more other video processing computers can be selected based on the quantity of resources available and can further be selected based on the applications available, the physical processors available, the network connectivity with to the managing video processing computer, or some other factor.

As an example, for scheduling video processing associated with cameras 120-122, management service 142 can first allocate processing that uses the resources of video processing computer 110. Management service 142 then identifies one or more other video processing computers with capacity to service the remaining video processing operations, and include the requisite hardware, software, and connectivity for the processing. If multiple video processing computers are available to support the remaining processing, management service 142 can select the video processing computer with the most available resources. Alternatively, management service 142 can select the video processing computer randomly, can select the video processing computer based on physical proximity of the offloading video processing computer, or can select the other computer based on some other factor.

Although demonstrated in the example, of FIGS. 2 and 3 as selecting another video processing computing in computing environment 100, management service 142 may schedule at least a portion of the video data from cameras 120-127 to be process in cloud processing service 140. Cloud processing service 140 can be scheduled when not enough resources are available from other video processing computers, when security is required for processing the video data, or based on some other factor. For example, if video processing system 112 required additional secure video processing (i.e., video processing not permitted at other local video processing computers), management service 142 can select cloud processing service 140 capable of providing the resources for video processing computer 112.

FIG. 4 illustrates an operational scenario 400 of distributing video data in a computing environment for processing according to an implementation. Operational scenario 400 includes the systems and elements from computing environment 100 and further includes video data 410-412 that is provided from cameras 120-122.

As described previously, management service 142 can obtain resource usage information associated with video processing computers 110-112, wherein video processing computers 110-112 can each manage the processing of video data from corresponding cameras 120-127. In some implementations, the cameras can be located on the same local network as the corresponding video processing computer. Based on the resource usage information and, in some examples, additional factors (hardware requirements, software requirements, security requirements), management service 142 can schedule the processing of the video data from cameras 120-127 across video processing computers 110-112. In some implementations, management service 142 may attempt to provide video data processing at the local video processing computer or the computer responsible for the management of the cameras. If resources are not available to support all the processing on a managing video processing computer, processing can be assigned at another video processing computing in the computing environment. Further, if resources are required that cannot be provided by video processing computers 110-112, then the processing can be directed to cloud processing service 140.

Here, video processing computer 110 is provided with a schedule that directs data video data 410 to be processed at video processing computer 110, directs video data 411 to be communicated to video processing computer 111, and directs video data 412 to be communicated to cloud processing service 140. As the data is received from cameras 120-122, video processing computer 110 can process the corresponding data or forward data to the corresponding computer or service. The schedule can be dynamic where a first portion of the schedule uses first computers for data processing, while a second portion of the schedule uses second computers for data processing.

Although demonstrated as distributing the video data itself, multiple data processing operations can be performed on the data. As an example, a first operation can be used as a first pass on the video data from a camera and, if an object of interest is identified in the video data, the relevant video data can be processed by another operation. Thus, while a first operation is performed at video processing computer 110, the second operation can be performed at video processing computer 111 or cloud processing service 140. Once processed any required data for video processing computer 110 can be returned to video processing computer 110. The returned information can include portions of video data, an indication of whether an object is in the video data or movement of the object in the frame of the video data, or some other information base to video processing computer 110. Video processing computer 110 can then store the information, generate a display from the information, provide additional processing, or perform some other operation.

Figure 5:
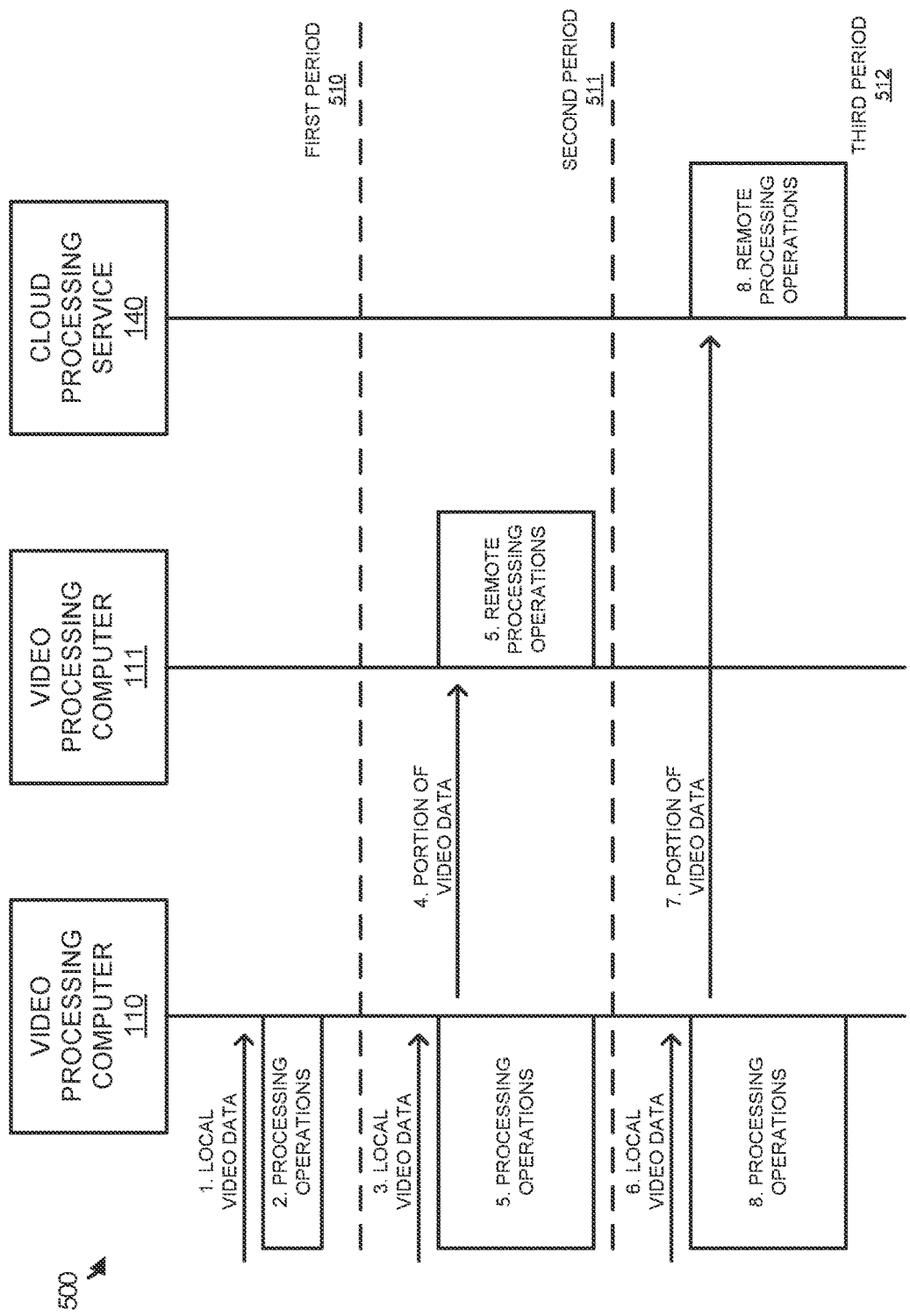
FIG. 5 illustrates a timing diagram for distributing video data from a computer according to an implementation.

FIG. 5 illustrates a timing diagram 500 for distributing video data from a computer according to an implementation. Timing diagram 500 includes video processing computers 110-111 and cloud processing service 140 from computing environment 100 of FIG. 1. Timing diagram 500 further includes periods 510-512 that are representative of different periods scheduled by a management service for distributing the data processing.

In timing diagram 500 and first period 510, video processing computer 110 receives local video data (from cameras 120-122 not pictured) at step 1 and provides processing operations on the video data at video processing computer 110 at step 2. The operations can be used to identify objects of interest captured in the frames of the video data, track the movement of objects in the video data, or provide some other video processing operation. After period 510 expires and period 511 begins, video processing computer 110 receives additional local video data at step 3 and distributes at least a portion of the video data to video processing computer 111 at step 4. As the data is distributed video processing computers 110 perform processing operations on the video data at step 5. In some implementations, when a video processing computer 110 is scheduled to distribute video data to one or more other video processing computers for processing, video processing computer 110 can provide configuration information to video processing computer 111. The configuration information can include objects of interest, code configurations, or other information to process the video data. Thus, in the example of second period 511, video processing computer 110 will provide configuration information (metadata, code, and the like) to video processing computer 111, permitting video processing computer 111 to implement the desired operations. Additionally, although not depicted in FIG. 5, video processing computer 111 can also provide one or more data processing operations in association with its own managed cameras or can provide operations in association with another video processing computer in the computing environment.

After the expiration of second period 511 and the start of third period 512, video processing computer 110 receives additional local video data at step 6 from the managed cameras and distributes a portion of the video data to cloud processing service 140 at step 7. Video processing computer 110 and cloud processing service 140 provide processing operations on the video data at step 8. Here, cloud processing service 140 is selected when another video processing computer is not capable of providing the required data processing (i.e., not available, or incapable of providing adequate quality of service). Cloud processing service 140 can process specific portions of the data, provide additional operations on the video data, or provide some other data processing operation in association with the video data. As an example, video processing computer 110 may provide a first pass on the video data and can communicate relevant video data (e.g., video data identified as of interest) to cloud processing service 140.

In some implementations, the management service can monitor or sample the resource usage for the video processing computers at various intervals and update the scheduling for data processing based on the monitored usage. Advantageously, while a video processing computer can use first resources during a first period, the video processing computer can use second resources during a second period. As a result, the management service can update the schedule to use the available resources at the video processing computer.

Figure 6:
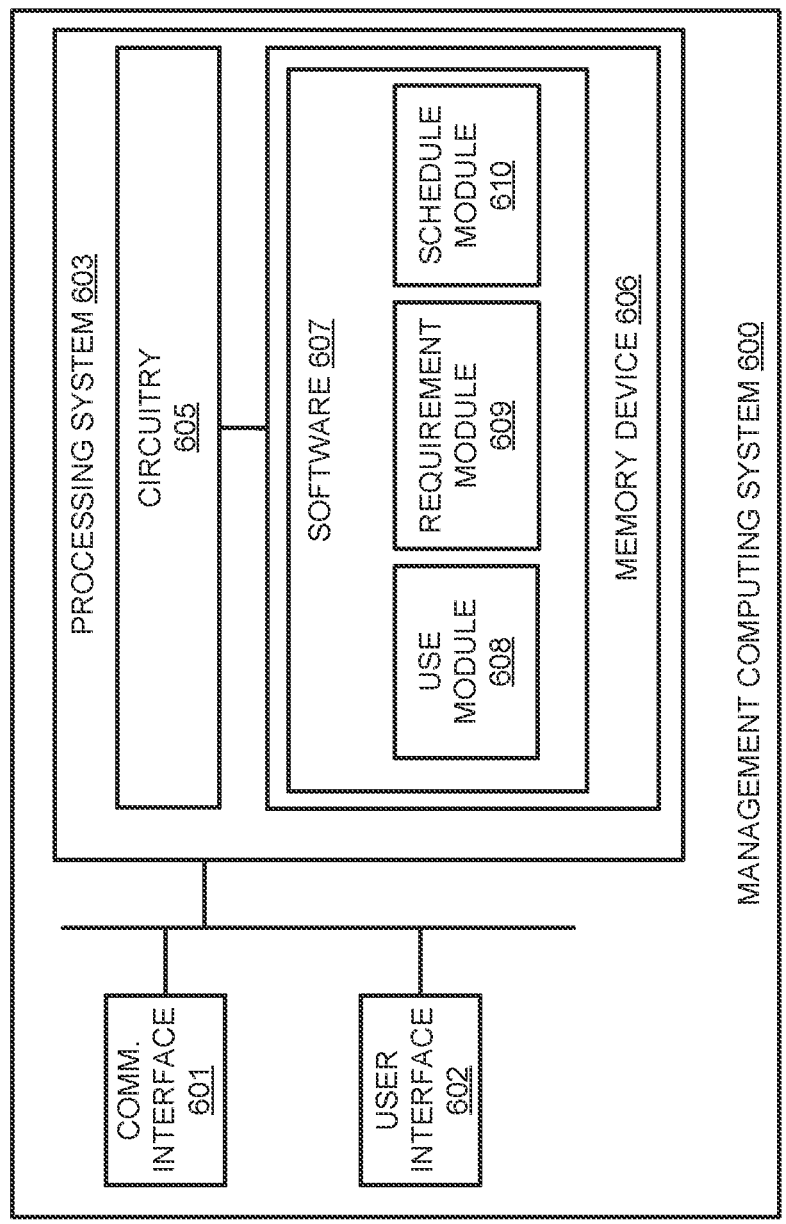
FIG. 6 illustrates a management computing system to manage scheduling of video processing in a computing environment according to an implementation.

FIG. 6 illustrates a management computing system 600 to manage scheduling of video processing in a computing environment according to an implementation. Computing system 600 is representative of any computing system or systems with which the various operational architectures, processes, scenarios, and sequences disclosed herein for a management system, such as management service 142. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, management service 142 can communicate with video processing computers to identify resource usage at the various video processing computers. Management service 142 can also communicate with a cloud processing service and the video processing computers to configure a processing schedule at each of the video processing computers.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may permit a user to request and process various video data stored in multiple storage locations. User interface 602 may be omitted in some examples.

Processing circuitry 605 comprises microprocessor and other circuitry that retrieves and executes operating software 607 from memory device 606. Memory device 606 may include volatile and nonvolatile, removable, and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes use module 608, requirement module 609, and schedule module 610, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein. In at least one example, operating software 607 directs processing system 603 to implement operations 200 and/or 300 described above with respect to FIGS. 2 and 3.

In one implementation, use module 608 directs processing system 603 to monitor resource usage associated with video processing computers during a first period, wherein each video processing computer of the video processing computers manages video processing of video data associated with one or more cameras. In at least one implementation, the cameras managed by each of the video processing computers are on the same local network as the corresponding video processing computer. For example, a video processing computer can be located at a business that deploys a plurality of cameras managed by the video processing computer. The resource usage can include memory resources, processor resources, or some other computer resource used by the plurality of video processing computers. The resource usage can also indicate the usage associated with each video processing operation.

As the resource usage is monitored, use module 608 further directs processing system 603 to identify resource usage trends associated with the video processing computers. In at least one example, the usage trends can be used to predict usage as a function of time. As an example, a trend for a video processing operation can indicate that the operation uses first resources (processor, memory, and the like) during a first period, while the video processing operation uses second resources during a second period. The operation can be used to identify objects in the video data, movement of the objects in the video data, or provide some other operation in association with the video data.

After the trends are identified, schedule module 610 directs processing system 603 to, for a first video processing computer of the video processing computers, generate a video processing schedule for a second period for the video data from the one or more cameras managed by the first video processing computer based on the resource usage trends, wherein the video processing schedule assigns the video processing to two or more video processing computers of the video processing computers. In at least one example, when scheduling the processing of the video data, schedule module 610 can prefer to process the video data locally at the video processing computer that manages the corresponding cameras. If resources are available at the local video processing computer or the managing video processing computer, then the video processing can be scheduled locally at the managing video processing computer. If the resources are not available at the managing video processing computer, then schedule module 610 can schedule at least a portion of the video data to be processed using another video processing computer or a cloud service provider.

In some implementations, in scheduling the video processing, requirement module 609 directs processing system 603 to identify supplemental requirement factors associated with scheduling the data processing across the video processing computers. The supplemental factors can include software requirements associated with a data processing operation, hardware requirements associated with a data processing operation, networking requirements associated with a data processing operation, security requirements associated with a data processing operation, or some other factor. As an example, a first data processing operation for a video processing computer may require first software to identify objects in a video data stream. Accordingly, requirement module 609 will only identify computing systems with the required software to support the first data processing operation for the video processing computer. When multiple computers can support an operation offloaded from another computer, schedule module 610 can direct processing system 603 to identify the computer that is closest in proximity to the offloading computer, identify the computer with the most processing or memory headroom to support the operation, identify the computer at random from the set of available computers, or can identify the computer by some other means. Similar operations can also be performed for selecting multiple computers.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
monitoring resource usage of video processing computers during a first period of processing video data received from cameras, wherein each video processing computer of the video processing computers is connected to a different subset of the cameras to schedule video processing of video data captured by the different subset of the cameras;
identifying resource usage trends of the video processing computers from the resource usage; and
for a first video processing computer of the video processing computers:
generating a video processing schedule for a second period for first video processing of first video data from a first subset of the cameras connected thereto based on the resource usage trends, wherein the first video processing computer, wherein the video processing schedule assigns the first video processing to two or more video processing computers of the video processing computers; and
configuring the first video processing computer to distribute the first video processing between the two or more video processing computers in accordance with the video processing schedule.

2. The method of claim 1 further comprising, for the first video processing computer:
determining latency requirements associated with the first video processing of the first video data;
wherein generating the video processing schedule for the second period is further based on the latency requirements.

3. The method of claim 1 further comprising, for the first video processing computer:
determining software configuration requirements associated with the first video processing of the first video data;
wherein generating the video processing schedule for the second period is further based on the software configuration requirements.

4. The method of claim 1 further comprising, for the first video processing computer:
determining computer resource requirements associated with the first video processing of the first video data, wherein the computer resource requirements comprise processor type requirements;
wherein generating the video processing schedule for the second period is further based on the computer resource requirements.

5. The method of claim 1 further comprising:
in the first video processing computer, distributing at least a portion of the first video data to a second video processing computer of the video processing computers based on the video processing schedule.

6. The method of claim 5, wherein the first video processing computer and the second video processing computer comprise computers on different local networks.

7. The method of claim 5 further comprising, in the second video processing computer:
executing a video processing operation on the portion of the first video data from the first video processing computer.

8. The method of claim 1, wherein the video processing of the first video data comprises an object identification process to identify objects in the first video data.

9. The method of claim 1, wherein the resource usage comprises memory resource usage and processor usage.

10. The method of claim 1, wherein the video processing schedule further assigns the video processing to a cloud service provider.

11. A computing apparatus comprising:
a storage system;
a processing system operatively coupled to the storage system; and
program instructions stored on the storage system that, when executed by the processing system, direct the computing apparatus to:
monitor resource usage of video processing computers during a first period of processing video data received from cameras, wherein each video processing computer of the video processing computers is connected to a different subset of the cameras to schedule video processing of video data captured by the different subset of the cameras;
identify resource usage trends of the video processing computers from the resource usage; and
for a first video processing computer of the video processing computers:
generate a video processing schedule for a second period for first video processing of first video data from a first subset of the cameras connected thereto based on the resource usage trends, wherein the first video processing computer, wherein the video processing schedule assigns the first video processing to two or more video processing computers of the video processing computers; and
configure the first video processing computer to distribute the first video processing between the two or more video processing computers in accordance with the video processing schedule.

12. The computing apparatus of claim 11, wherein the program instructions further direct the computing apparatus to, for the first video processing computer:
determine latency requirements associated with the first video processing of the first video data;
wherein generating the video processing schedule for the second period is further based on the latency requirements.

13. The computing apparatus of claim 11, wherein the program instructions further direct the computing apparatus, for the first video processing computer:
determine software configuration requirements associated with the first video processing of the first video data;
wherein generating the video processing schedule for the second period is further based on the software configuration requirements.

14. The computing apparatus of claim 11, wherein the program instructions further direct the computing apparatus to:
determining computer resource requirements associated with the first video processing of the first video data, wherein the computer resource requirements comprise processor type requirements;
wherein generating the video processing schedule for the second period is further based on the computer resource requirements.

15. The computing apparatus of claim 11, wherein the video processing of the first video data comprises an object identification process to identify objects in the first video data.

16. The computing apparatus of claim 11, wherein the resource usage comprises memory resource usage or processor usage.

17. A system comprising:
a plurality of video processing computers; and
a management service executing on one or more computers and configured to:
obtain resource usage of the plurality of video processing computers during a first period of processing video data received from cameras, wherein each video processing computer of the plurality of video processing computers is connected to a different subset of the cameras to schedule video processing of video data captured by the different subset of the cameras;
identify resource usage trends of the plurality of video processing computers from the resource usage; and
for a first video processing computer of the plurality of video processing computers:
generate a video processing schedule for a second period for first video processing of first video data from a first subset of the cameras connected thereto based on the resource usage trends, wherein the first video processing computer, wherein the video processing schedule assigns the first video processing to two or more video processing computers of the plurality of video processing computers; and
configure the first video processing computer to distribute the first video processing between the two or more video processing computers in accordance with the video processing schedule.

18. The system of claim 17, wherein the management service is further configured to:
determine software configuration requirements associated with the first video processing of the first video data;
wherein generating the video processing schedule for the second period is further based on the software configuration requirements.

19. The system of claim 17, wherein the first video processing computer is configured to:
distribute at least a portion of the first video data to a second video processing computer of the plurality of video processing computers based on the video processing schedule.

20. The system of claim 17, the different subset of the cameras connected to each video processing computer of the plurality of video processing computers is on a same local network as a corresponding video processing computer.

* * * * *